United States Patent [19]

Aoki et al.

[11] Patent Number: 5,838,890
[45] Date of Patent: Nov. 17, 1998

[54] HOUSEHOLD INFORMATION SYSTEM DATA PROCESSOR CHANGING AN INITAL IMAGE

[75] Inventors: Yoichi Aoki; Yasuo Satoh; Chiaki Ito; Seizi Kakizawa; Shinichi Konya; Haruhiko Mio; Makoto Wanishi; Takeo Asawa, all of Kawasaki, Japan

[73] Assignee: Fujitsu Limited, Kawasaki, Japan

[21] Appl. No.: 774,587

[22] Filed: Dec. 24, 1996

Related U.S. Application Data

[63] Continuation of Ser. No. 118,746, Sep. 10, 1993, abandoned.

[30] Foreign Application Priority Data

Feb. 10, 1993 [JP] Japan .................................. 5-022418

[51] Int. Cl.$^6$ ........................................................ G06F 3/00
[52] U.S. Cl. .................................................................. 395/174
[58] Field of Search .................................. 395/806, 807, 395/133, 137, 173, 174, 348, 349, 351, 652; 345/121, 122, 123, 126, 145

[56] References Cited

U.S. PATENT DOCUMENTS

| | | | |
|---|---|---|---|
| 5,289,568 | 2/1994 | Hosoya et al. ........................... | 395/155 |
| 5,337,402 | 8/1994 | Kitagawa et al. ....................... | 395/155 |
| 5,359,710 | 10/1994 | Aono et al. ............................. | 395/155 |

OTHER PUBLICATIONS

Rush et al., After Dark Manual, Berkeley Systems, Inc., 1991, pp. 2, 5–7, 14, 17, 30.
Macintosh Reference, Apple Computer, Inc., 1990, p. 158.
Deborah Brock, Star Trek: The Screen Saver Manual, Berkeley Systems, Inc., 1992, pp. 2–3, 9, 22, 24.

*Primary Examiner*—Heather R. Herndon
*Assistant Examiner*—Stephen Hong
*Attorney, Agent, or Firm*—Staas & Halsey

[57] ABSTRACT

A data processor such as a household information system which is realized by an image display with which the initial image of the system changes every time the system is started, and the displayed object moves interactively, employing a small memory. When the power source of the processor is turned on, the initial image display processing unit is started. In the initial image display processing unit, the screen display update processing unit changes the image on the display unit every after a predetermined period of time based upon the state of the images that have been stored in advance in the state storage unit. Moreover, any input from the input unit is detected by the input detect unit. Then, the image state select processing unit selects the state of a new image that corresponds to the input and stores it in the state storage unit.

8 Claims, 9 Drawing Sheets

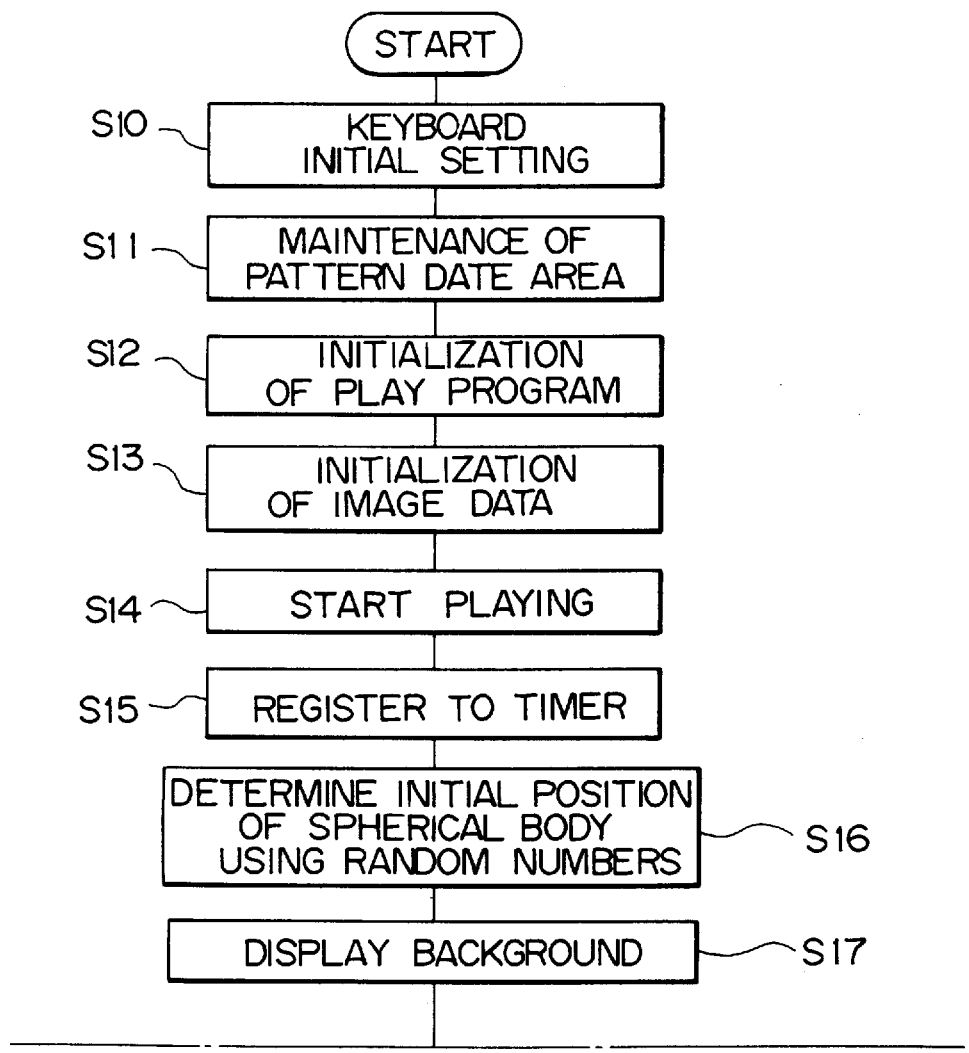

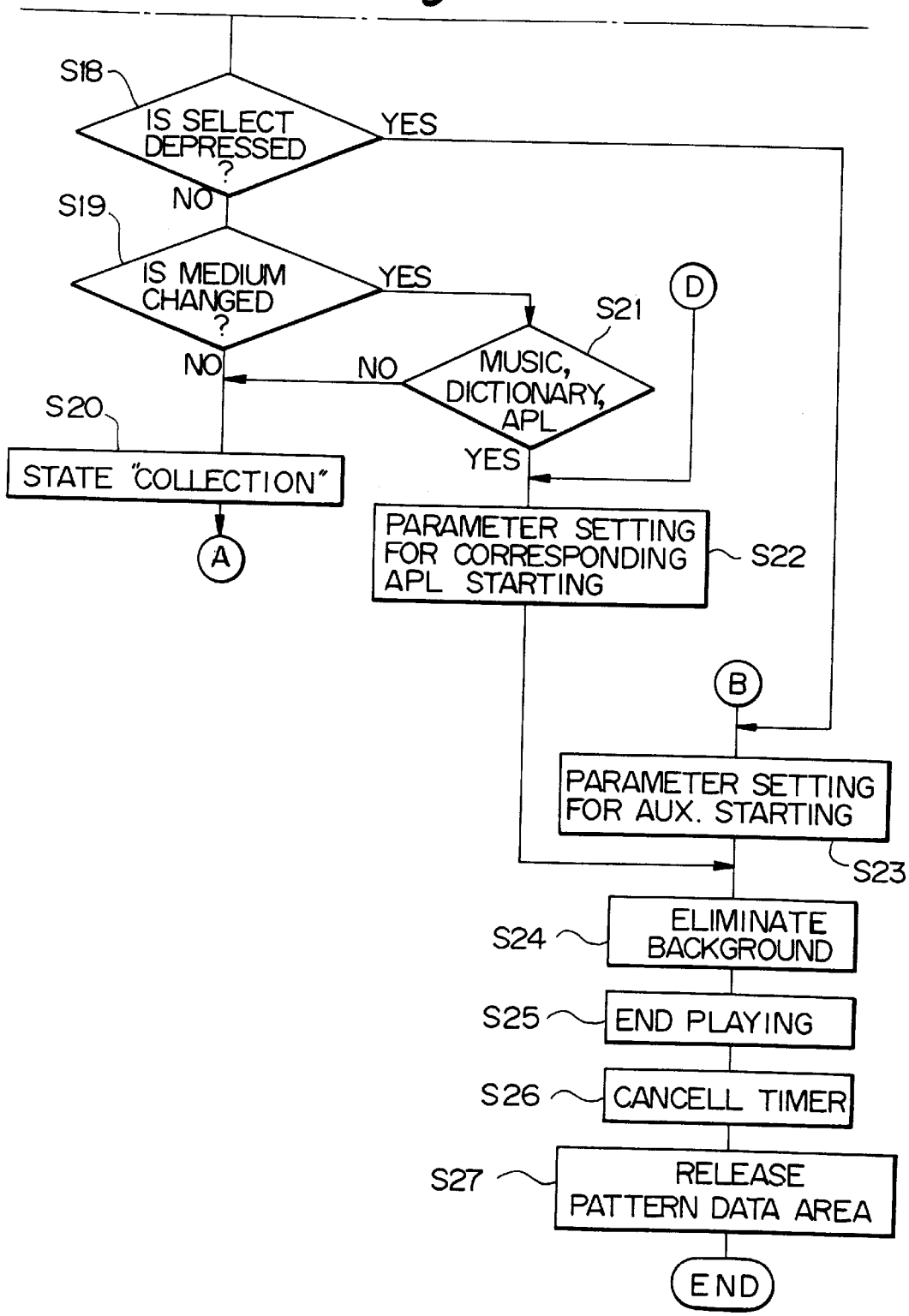

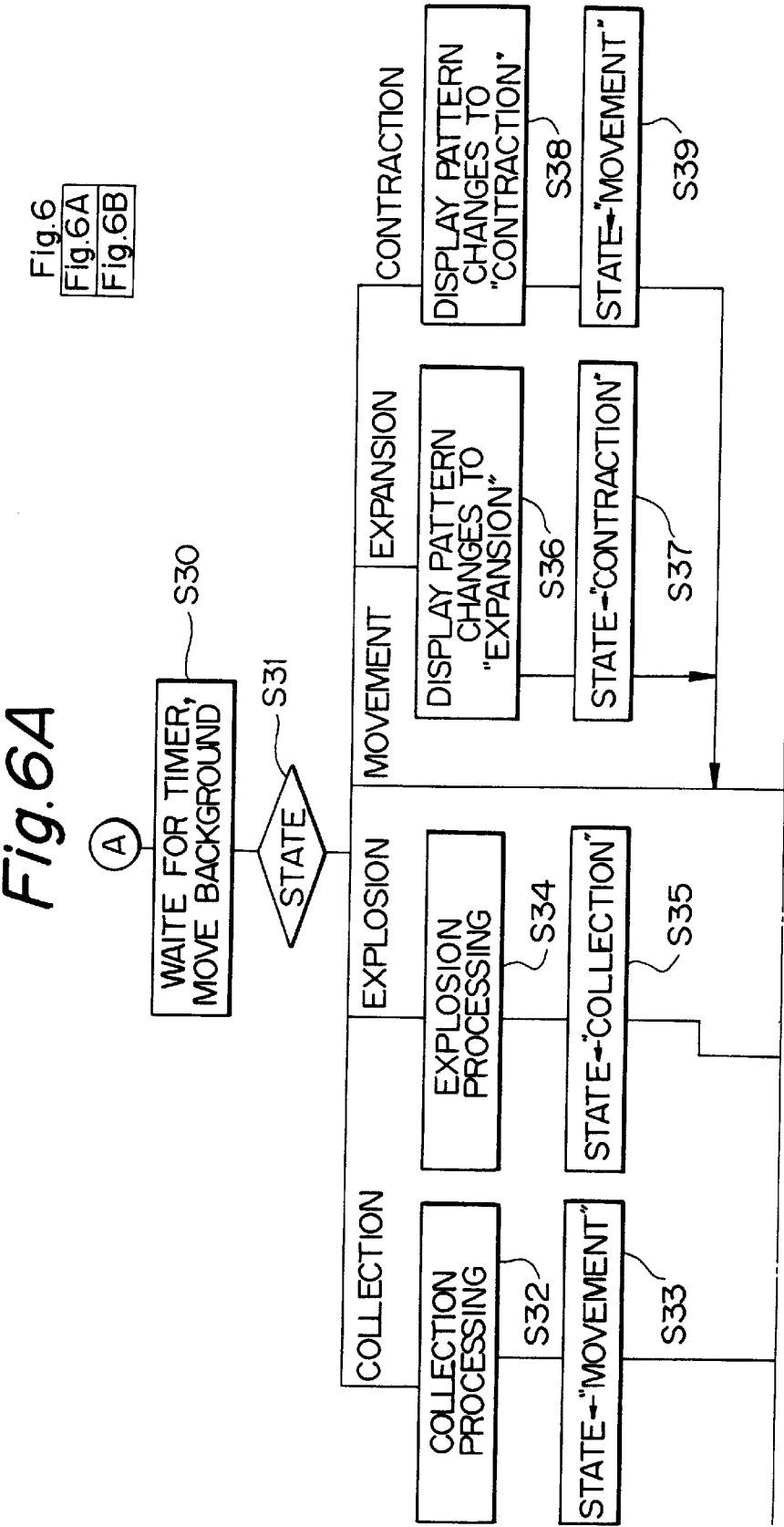

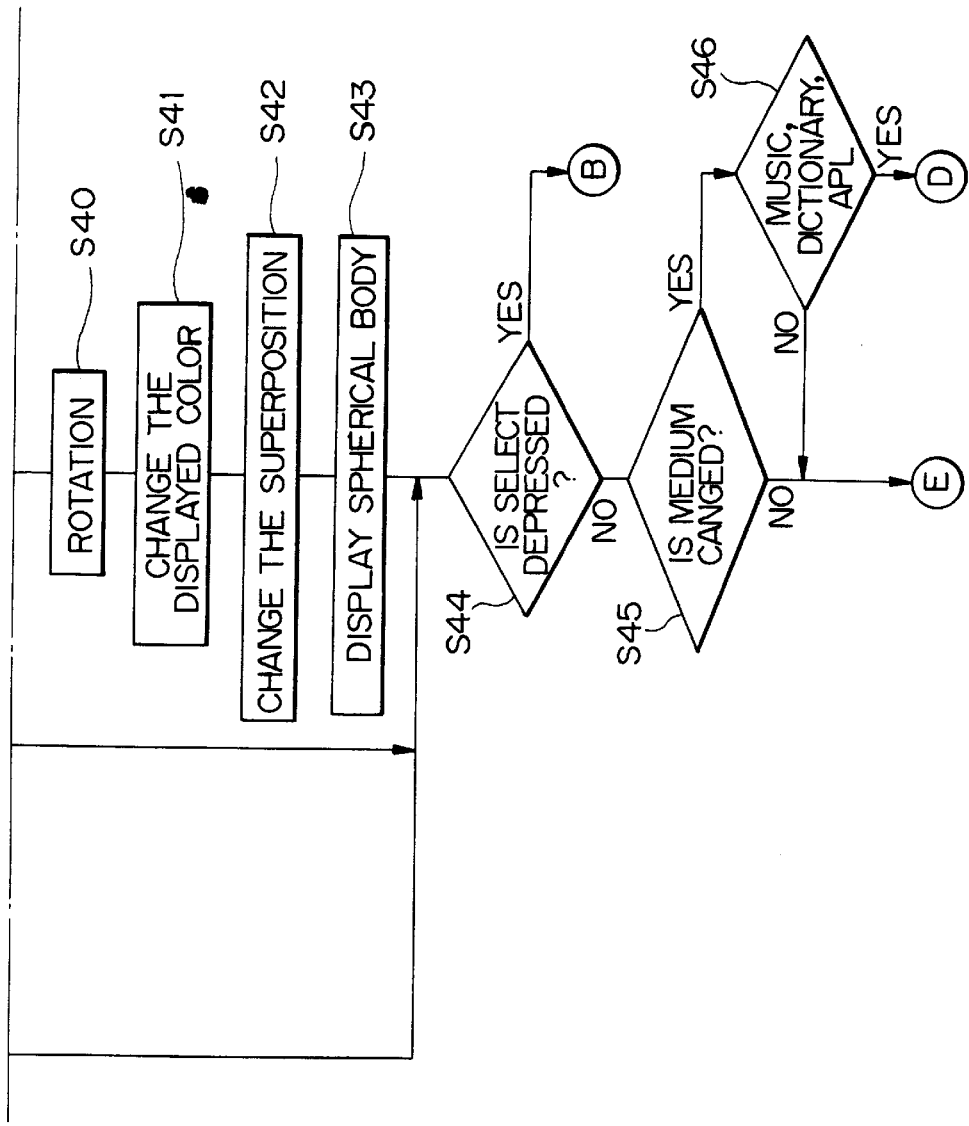

HOUSEHOLD INFORMATION SYSTEM DATA PROCESSOR CHANGING AN INITAL IMAGE

This application is a continuation, of application Ser. No. 08/118,746, filed Sep. 10, 1993, now abandoned.

BACKGROUND OF THE INVENTION

1. Field of the Invention

The present invention relates to a data processor such as one for a so-called household information system and, particularly, to a data processor of which the initial image changes every time the system is started.

2. Description of the Related Art

Personal computers are now used in a wide range of applications not only as computers for operating ordinary application programs but even in such domestic uses such as systems for reproducing music, systems for retrieving dictionaries, and the like. Such computers require user-friendly technology and technology which the users find amusing.

Data processors such as personal computers need some period of time for loading a system program from when the power source is turned on until the processors are ready to be used. The user may feel that it is a very long time before the system starts operating if nothing is displayed on the display and if the system does not respond to the input from the keyboard until the system is ready to be used.

In order to solve this problem, attempts have heretofore been made to prepare several pieces of still images and to display them on a display until the system starts working. Or, it has been attempted to successively replace several pieces of still images to make the still images look like moving images.

According to the conventional system, however, the user is forced to look at the same image while the system is starting and becomes bored during the time before the system really starts operating. When a method is employed in which several pieces of still images are being replaced by one another, on the other hand, a large quantity of image data must be prepared in a directly readable memory necessitating a large amount of memory. Before the system starts operating, furthermore, key operation by the user is usually inhibited.

SUMMARY OF THE INVENTION

The object of the present invention is to solve the above-mentioned problems and to realize an image display with which the initial image of the system changes every time the system is started, and the displayed image moves interactively, by employing a memory of a small capacity.

In order to achieve the above-mentioned object, the data processor according to the present invention basically has the technical constitution described below.

That is, a data processor having a display unit, an input unit and a central processing unit, comprising an initial image display processing unit which is driven when the power source is turned on and processes the initial image that will be displayed on said display unit and a state storage unit for storing the state of the image that is to be displayed the initial image display processing unit comprises a screen display update processing unit which changes the image on said display unit with the passage of time based on the state of the image that is to be displayed; an input detect unit that detects the input from said input unit; and an image state select processing unit which selects, in response to an input from said input unit, the state of the image that has been determined in advance in response to said input, and stores the selected state in said state storage unit.

BRIEF DESCRIPTION OF THE DRAWINGS

FIGS. 5(A) and 5(B) are part of flow charts of processing an initial image display processing means according to the embodiment of the present invention;

FIGS. 6(A) and 6(B) are part of flow charts of processing of the initial image display processing means according to the embodiment of the present invention.

DETAILED DESCRIPTION OF THE PREFERRED EMBODIMENT

A data processor according to an embodiment of the present invention will now be described, in detail, in conjunction with the drawings.

Figure 1:
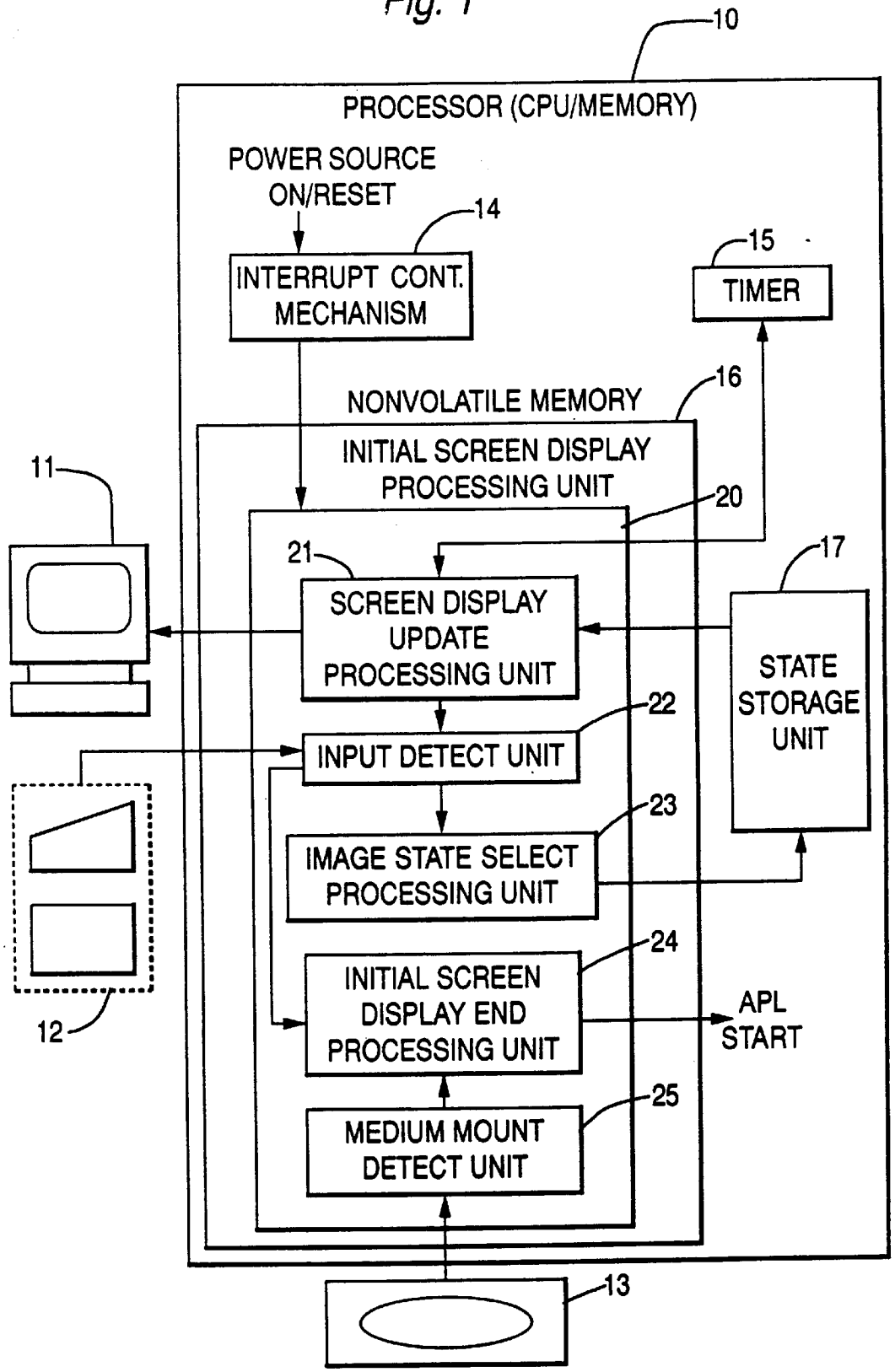
FIG. 1 is a diagram illustrating the constitution of the present invention.

FIG. 1 illustrates the constitution according to an embodiment of the present invention, wherein reference numeral 10 denotes a processor comprising a central processing unit (CPU), a memory and the like, 11 a display unit, 12 an input unit such as a keyboard or a joy pad, 13 an external storage unit such as a compact disk (CD) or a flexible disk (FD), 14 an interrupt control mechanism which changes the blow of program to a predetermined address depending upon an interrupt factor, 15 a timer for measuring the passage of time, 16 a nonvolatile memory constituted by a ROM to which an address is allotted, 17 a state storage unit for storing the state of an image that is to be displayed, and reference numeral 20 denotes an initial image display processing unit.

The initial image display processing unit 20 is constituted by a program stored in the nonvolatile memory 16, and comprises an image display update processing unit 21, an input detect unit 22, an image state select processing unit 23, an initial image display end processing unit 24 and a medium mount detect unit 25.

The screen display update processing unit 21 changes the image on the display unit 11 with the passage of time based on the state of the image. The input detect unit 22 detects the input from the input unit 12. Based on the input from the input unit 12 detected by the input detect unit 22, the image state select processing unit 23 selects the state of the image, that has been determined in advance, in response to the input and stores it in the state storage unit 17.

The screen display update processing unit 21 changes the image based on the state that has been set to the state storage unit 17 every after predetermined period of time measured by the timer 15.

Attributes such as position, color, moving speed, etc. of a predetermined object to be displayed on the initial screen of the initial image display processing unit 20, are determined by random numbers.

The words "state of the image" referred to in the present invention stand for a state for changing the image such as collecting the image, exploding the image, moving the image, expanding the image, contracting the image, and so on.

The medium mount detect unit detects the mounting of a storage medium by successively checking whether a storage medium, such as of media information, is mounted on the external storage unit 13 on which the medium can be detachably mounted. The initial image display end processing unit 24 terminates the display processing of the initial image upon receiving a predetermined input from the input unit 12 or upon detecting the mounting of the storage medium as detected by the medium mount detect unit 25, and starts the processing that corresponds to a predetermined auxiliary processing which will be described later or that corresponds to an external storage medium that is mounted.

The initial image display processing unit 20 is constituted by a program stored in predetermined addresses of the nonvolatile memory 16, and is started by the interrupt control mechanism 14 when the power source is turned on or when the apparatus is reset.

The operation of the aforementioned data processor of the present invention will now be described. That is, when the power source of the processor 10 is turned on, the initial image display processing unit 20 is started via the interrupt control mechanism 14. In the initial image display processing unit 20, the image display update processing unit 21 changes the image on the display unit 11 every after a predetermined period of time based upon the state of the images that have been stored in advance in the state storage unit 17. Moreover, any input from the input unit 12 is detected, by the input detect unit 22. Then, the image state select processing unit 23 selects the state of a new image that corresponds to the input and stores it in the state storage unit 17.

That is, in the initial stage, the image is changed every after a predetermined time interval depending on the data such as "movement" that represents the state of change of image stored in the state storage unit 17. The image then corresponds to the image state such as collection, explosion, movement, expansion or contraction in response to the input data from the separately provided input unit 12. If the data that is input represents the image state of, for example, "explosions", then this image state, i.e., "explosion", is stored in the state storage unit 17 and, then, the image displayed on the display unit is changed into the state of explosion.

Therefore, the initial screen of the system undergoes a condition change so that the user will not find it boring. Furthermore, the state of the image changes in response to the input by the user, the image changing its motion, and the user can enjoy changes of the image upon arbitrarily performing an input operation. In the present invention, the conventional method in which a plurality of still images have been previously prepared in advance, and one of the still images is selected in turn to be displayed by a suitable switching technique, is not used, but the method in which the image is displayed in a dynamically changing manner is used. Therefore, a screen which undergoes a change can be realized using a small memory.

According to another embodiment of the present invention, in particular, the screen display update processing unit 21 is operated by a timer 15. This makes it easy to obtain an opportunity to update the image so that the image can be changed at any times.

According to a further embodiment of the present invention, the initial image display processing unit 20 determines the attributes such as position, color, moving speed, etc. of a predetermined object to be displayed on the initial image relying upon the random numbers. It can therefore display an image that changes every time the system starts.

According to a still further embodiment of the present invention, the display processing of the initial image is terminated upon receiving a predetermined input from the input unit 12 or upon the mounting of an external storage medium having predetermined stored information, and processing is started that corresponds to a predetermined auxiliary processing or to the external storage medium that is mounted, in order to realize an easy-to-operate system that is suited for household information systems.

According to a yet further embodiment of the present invention, a program constituting the initial image display processing unit 20 is stored in predetermined addresses of the nonvolatile memory 16 that executes the control operation when the power source is turned on or when the system is reset, so that the initial image can be displayed quickly and easily when the power source is turned on or when the system is reset.

The invention will now be described by way of preferred embodiments.

FIGS. 2A–2D are diagrams for explaining images displaced according to an embodiment of the present invention.

Figure 2A:
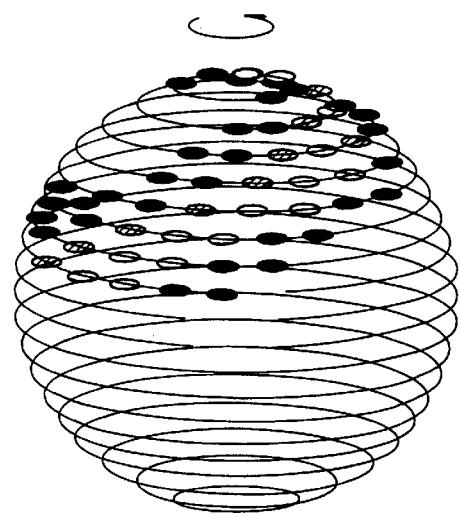
FIGS. 2A–2D are diagrams for explaining examples of images displayed according to the embodiment of the present invention.
Figure 2B:
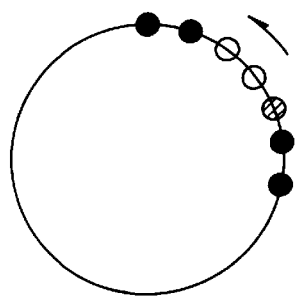

In this embodiment, the initial image displayed when the power source is turned on is the one which displays an image that appears as if a collection of color noise particles is turning on the surface of a sphere as shown in FIG. 2(A) with white noise that is constantly moving as a background. The color noise particles undergo a circular motion being arranged as shown in FIG. 2(B). The collection of color noise particles is hereinafter referred to as a spherical body. This image is only one example as a matter of course, and the embodiment of the invention is in no way limited to displaying the above image only.

Figure 2C:
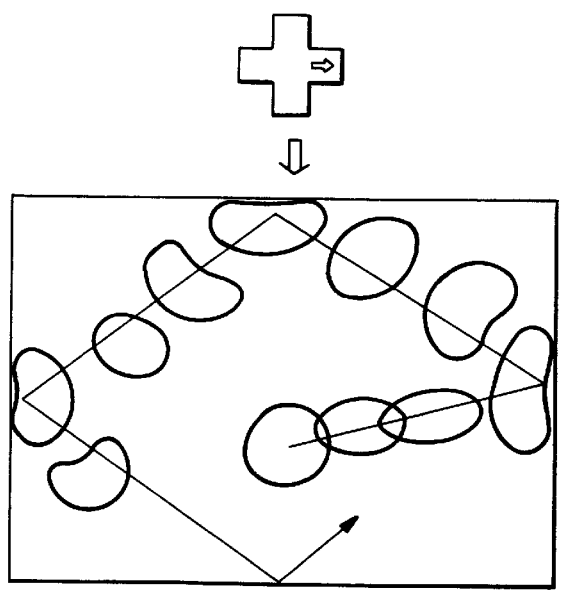

The spherical body shown in FIG. 2(A) moves on the screen in a manner as if it moves in three-dimensional space. The direction of this movement can be changed as shown in FIG. 2(C) by manipulating, for example, the joy-pad. That is, when the right button of the pad is depressed, the spherical body is accelerated toward the right direction. The spherical body is bounced as shown at the end of the screen or at an imaginal wall at the boundary of the three-dimensional region.

In order to display such an image, coordinates in a three-dimensional rectangular coordinate system are maintained as a position of the spherical body, and components in the directions of coordinate axes of the speed vector are maintained as the moving speed of the spherical body. The magnitude of the speed vector represents the amount the spherical body moves per unit time. The component of the corresponding speed vector is added to the components of coordinates indicating the position of the spherical body to realize the motion of the spherical body.

As for the initial position of the spherical body, the components of coordinates are determined by random numbers within a range that can be displayed on the screen. The initial speed is determined by random numbers within a suitable range. To realize the reflection by the wall surface, a limit of moving range of the spherical body is set for each of the directions of coordinate axis. When some of the components at the position of the spherical body exceed the boundary, the codes for the corresponding components of the speed vector are inverted.

A viewing point and a plane of projection are set in order to project the spherical body in three-dimensional space onto a plane. In order to simplify the calculation, the viewing point is set at an origin of the coordinate system and the plane of projection is set to be a plane which is perpendicular to one coordinate axis. Further, the difference of angle between the viewing axis and the position of the spherical body is neglected and everything is treated in the same manner as those which are on the viewing axis.

Figure 2D:
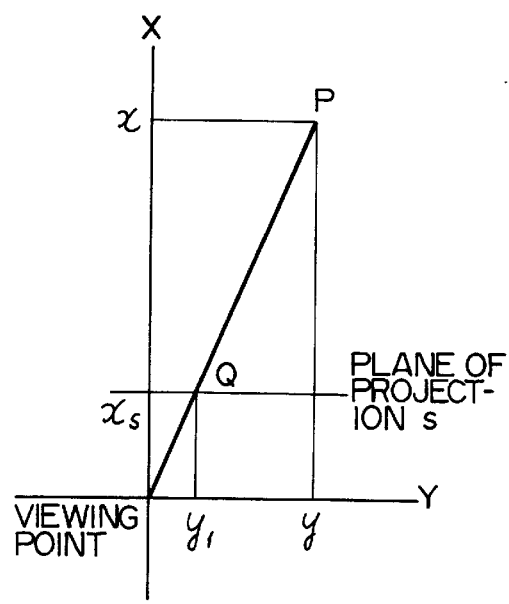

As shown, for instance, in FIG. 2(D), the coordinate at a given point P on the spherical body is denoted as P(x, y, z), and the plane of projection is selected to be a plane s that perpendicularly meets the X-axis at $x_s$. Then, a position $Q(y_1, z_1)$ at which a point on the spherical body is projected onto the plane of projection is given by the following formulas, $$y_1=(x_s/x)y$$
$$Z_1=(X_s/X)z$$

The moving direction and the moving speed of the spherical body can be changed by manipulating the joy pad. When the right button or the left button of the pad is depressed, the component which is projected as the motion in the horizontal direction of the screen are increased or decreased among the components of speed vector of the spherical body. The same holds true even when the upper button or the lower button of the pad is depressed, and the component of speed vector projected as the motion in the vertical direction of the screen is increased or decreased.

The button A of the joy pad is used to expand the spherical body; i.e., the data for gradually increasing the radius of the spherical body are prepared and are successively displayed maintaining a predetermined time interval measured by the timer 15, such that the spherical body is expressed in a smoothly expanding manner. The data are further prepared for gradually decreasing the radius of the spherical body and are successively displayed under the same condition as described above. This makes it possible to smoothly express the spherical body that is contracting initiate.

The button B of the joy pad is used to meet, for example, the divergence and re-collection of the spherical body. The divergence of the spherical body is hereinafter referred to as "explosion". The explosion of the spherical body is realized by presuming a plane of divergence on the viewing axis, and linearly moving a point that is in contact with the plane of divergence to a position outside the screen determined by random numbers on the spherical body on the plane of projection. The collection of the spherical body is realized by helically moving a position on the spherical body from a projected position to the center thereof on the plane of projection with an initial position, determined by random numbers, as a center.

FIGS. 3A–3F illustrates changes of a screen depending on the states according to an embodiment of the present invention.

Figure 3A:
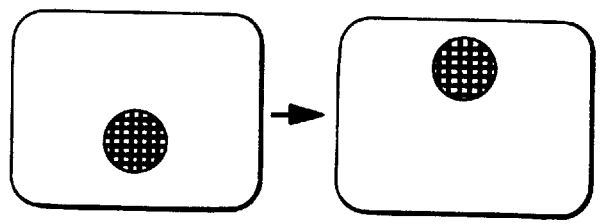
FIGS. 3A–3F are diagrams showing examples of changes in an image depending upon the states according to the embodiment of the present invention.
Figure 3B:
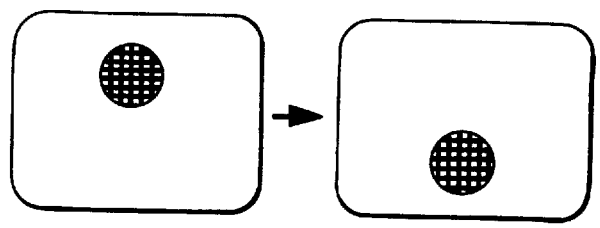
Figure 3C:
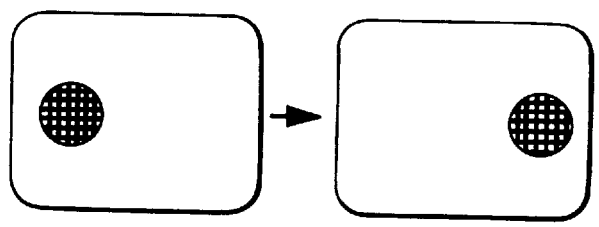
Figure 3D:
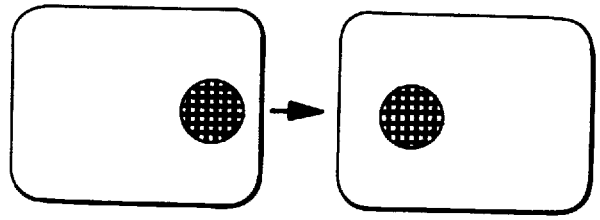

The state of the image changes depending upon the input operation as described earlier. When the upper button of the joy pad is depressed, for instance, the spherical body upwardly moves as shown in FIG. 3(A). When the lower button of the joy pad is depressed, the spherical body downwardly moves as shown in FIG. 3(B). By depressing the right button and left button, similarly, the spherical body moves toward the right and left, respectively, as shown in FIGS. 3(C) and 3(D).

Figure 3E:
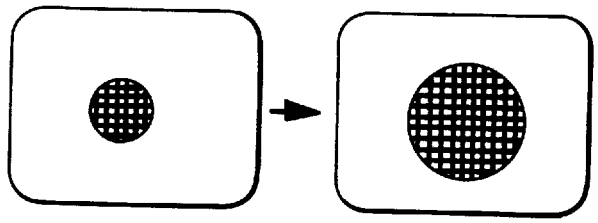
Figure 3F:
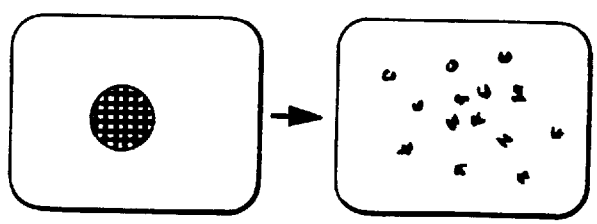

When the button A of the joy pad is depressed, the spherical body expands as shown in FIG. 3(E). When the button B is depressed, the spherical body explodes and scatters around as shown in FIG. 3(F).

Figure 4:
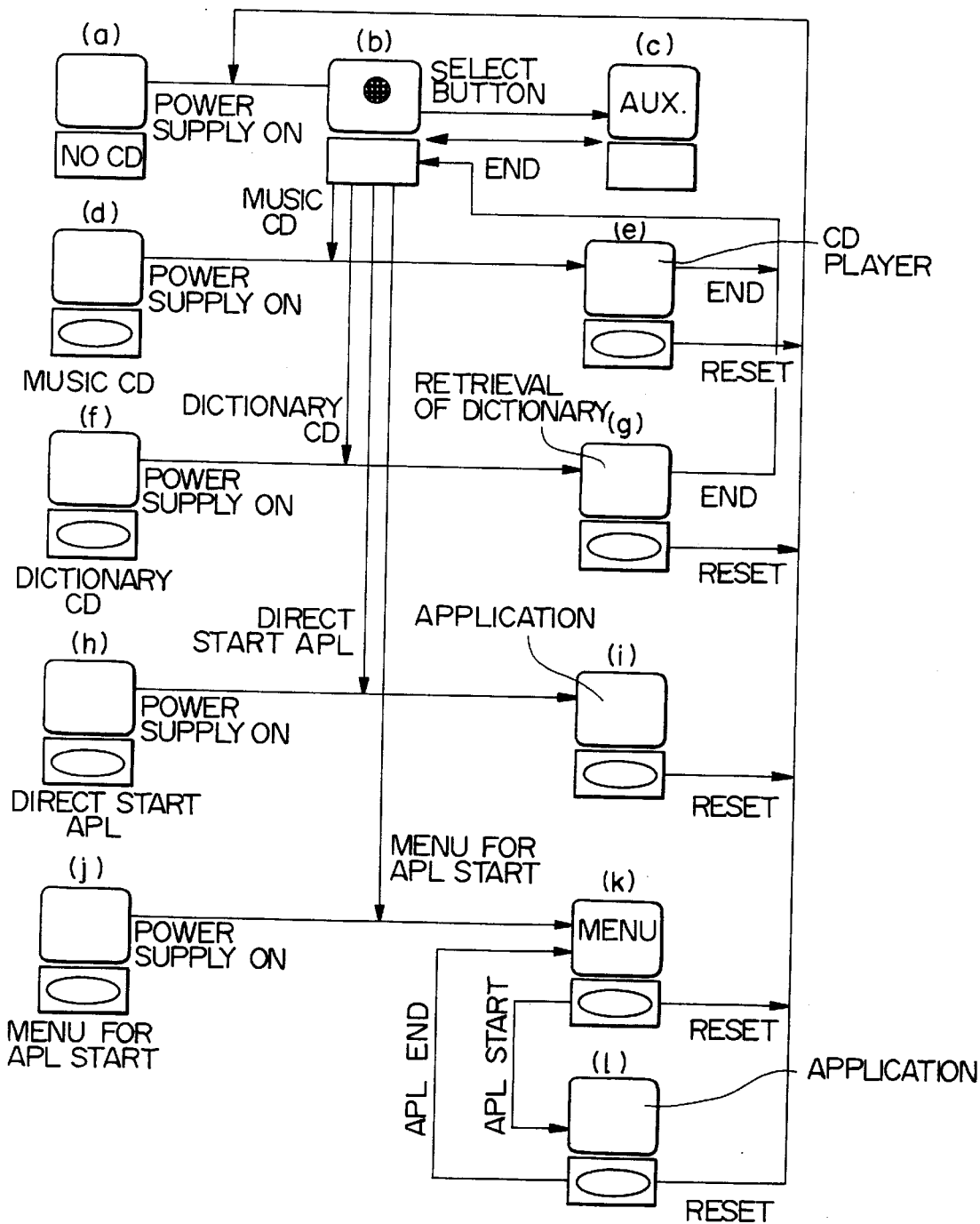
FIG. 4 is a diagram explaining the transition of state of the system according to the embodiment of the present invention.
Figure 7:
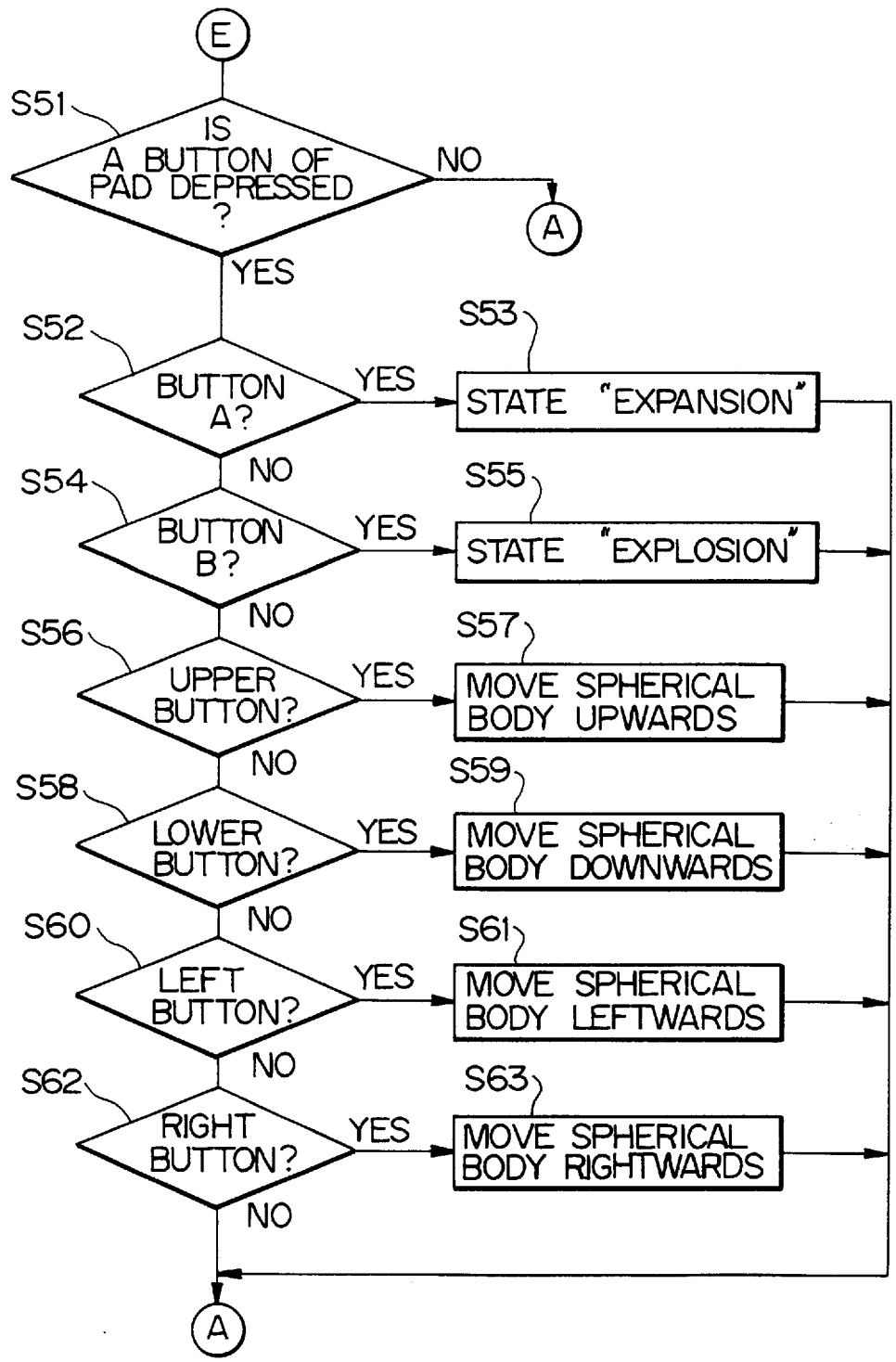
FIG. 7 is part of a flow chart of processing of the initial image display processing means according to the embodiment of the present invention.

FIG. 4 is a diagram for explaining the transition of state of the system according to the embodiment of the invention.

When the power source is turned on under the condition (a) where the storage medium such as a compact disk (CD) or the like is not mounted as shown in FIG. 4, the state goes to the initial image display state (b) of the present invention. Here, the display processing is carried out by the initial image display processing unit 20 depending upon the state stored in the state storage means 17. The initial image display state (b) is terminated by the following operation.

A SELECT button of the joy pad is depressed and the state goes to an auxiliary menu display state (c) where a menu is displayed for starting a variety of auxiliary programs such as initializing a floppy disk, setting the date and time, starting the CD player, etc. When the auxiliary programs are finished, the state returns to the state (b).

In the initial image display state (b), furthermore, any suitable storage medium that is mounted causes the state to go to a state that corresponds to the content of the storage medium. For instance, when a music CD is mounted, the state is transited to the CD player state (e). When a dictionary CD is mounted, furthermore, the state is transited to a dictionary retrieval state (g) enabling an electronic dictionary to be retrieved. After they are finished, the state returns back to the initial image display state (b).

When there is mounted a medium storing a game program or any other application program (APL) that can be directly started, a state (i) is assumed in which the application program runs. By mounting a medium storing a program that effects the menu control to start the application program, furthermore, the state goes to a menu display state (k) of a variety of applications such as a wordprocessor, a spreadsheet or the like. When an item of the menu is selected, the state goes to a state (1) of starting the application program that corresponds to the selected item of the menu.

When the power source is turned on under the condition where a storage medium is mounted as represented by the states (d), (f), (h) and (j) of FIG. 4, these states readily go to the states (e), (g), (i) and (k). When the system is reset under any of these states, then the state returns back to the state when the power source is turned on.

FIGS. 5(A), 5(B), 6(A), 6(B) and 7 are flow charts for processing the initial image display processing unit 20 according to the embodiment of the present invention.

The initial image display processing unit 20 is started when the power source is turned on. At a step S10, the initial image display processing unit 20 initially sets the keyboard and the joy pad so that inputs can be made. Then, a step S11 maintains a pattern data area for displaying the spherical body that is shown in FIG. 2. Moreover, a play program (driver for play) is initialized (step S12) so that music is played while the initial image is being displayed. A step S13 initializes the image data such as sprite in order to display the spherical body.

Next, play is started (step S14) using music data that have been prepared in advance. The data are sent to a timer to update the image (step S15). In this embodiment, the monitoring time is 100 ms. Random numbers are generated by a known random number generating algorithm in order to determine attributes such as initial position of the spherical body, initial speed, and color (step S16). A background due to white noise and the like is displayed (step S17).

Then, step S18 checks whether the SELECT button of the joy pad is depressed or not. When the button is depressed, the program proceeds to step S23. When the button is not depressed, the next step S19 checks whether the medium is changed or not, i.e., whether the storage medium such as CD or the like is mounted or not. When the medium is changed, the program proceeds to step S21.

If the medium is not changed, the state of the image stored in the state storage unit 17 is set to a state of "collection". The state of "collection" stands for the one in which a collection of color noise particles constitutes a spherical body as shown in FIG. 2(A). Referring next to FIGS. 6(A) and 6(B), a step S30 waits for the 100 ms timer and suitably moves the background white noise. Then, a state set to the state storage unit 17 is detected (step S31) and the spherical body is changed as described below.

When the state is "collection", step S32 effects the processing to collect the color noise particles to constitute a spherical body. The state is changed into "movement" (step S33) and the program proceeds to a step S44. When the state is "explosion", an explosion processing is carried out to disperse the noise particles (step S34). Thereafter, the state is changed into "collection" (step S35) and the program proceeds to a step S44.

When the state is "movement", the program proceeds to a step S40. When the state is "expansion", the display pattern is so changed by the step S36 that the display pattern of spherical body increases. The state is then returned back to "contraction" (step S37) and the program proceeds to the step S40. When the state is "contraction", the display pattern is so changed by a step S38 that the display pattern of spherical body becomes small. The state is then set to "movement" (step S39), and the program proceeds to the step S40.

The step S40 rotates the spherical body such that the color noise particles appear to be moving helically. Then, the color of the color noise particles is changed depending on the rotation (step S41). Here, the color is so changed that the spherical body appears three-dimensional based on the assumption that the spherical body is illuminated with light from an imaginary source of light. At step S42, furthermore, the figure elements are superposed depending upon the rotation and the movement. The spherical body is then moved and is displayed at a new position (step S43).

Next, step S44 checks whether the SELECT button of the joy pad is depressed or not. When the button is depressed, the program proceeds to step S23. When the button is not depressed, then a subsequent step S45 checks whether the medium is changed, i.e., whether the recording medium such as CD or the like is mounted. When the medium is changed, the program proceeds to a step S46.

When the medium is not changed, step S51 in FIGS. 5(A) and 5(B) determines whether the button A of the joy pad is depressed or not. When the button is not depressed, the program returns back to step S30 of FIGS. 6(A) and 6(B). When the button A is depressed, the state of the state storage unit 17 is set to "expansion" (steps S52 and S53), and the program returns back to step S30. When the button B is depressed, the state of the state storage unit 17 is set to "explosion" (steps S54 and S55), and the program returns back to step S30. When the upper button is depressed, the speed vector of the spherical body in the state storage means 17 is increased in the upwards direction (steps S56 and S57), and the program returns back to the step S30. The same holds true even for the lower button, left button and right button; i.e., the speed vector is increased in the respective direction (steps S58 to S63), and the program returns back to the step S30.

When the SELECT button is depressed during processing, the program moves to step S23 where a parameter is set to a predetermined value to start a program for displaying auxiliary menu. Then, to terminate the initial image display, the program proceeds to step S24 where the background is eliminated. The playing of music is terminated at a step S25, the timer for monitoring the time is canceled (step S26), and the pattern data area is released (step S27). Then, the initial image display processing is finished, and a program set by the parameter is started.

Upon detecting a change of the medium, step S21 determines whether the storage medium mounted is the one which stores music, a dictionary, or an application program that can be directly started. If it is not, the program returns back to the step S20 and ignores the change of medium. If it is the medium storing music CD, a dictionary CD or an application program that can be directly started, a step S22 sets parameters for starting the application program (including CD play program, dictionary retrieval program) and the program proceeds to the step S24.

A step S46 similarly determines whether the recording medium that is mounted is the one that is storing music, a dictionary or an application program that can be directly started. If it is, the program proceeds to the step S22 and if it is not, the program then proceeds to the step S51.

Through the above-mentioned processing, the display shows an initial image that undergoes movement reflecting the user's operation.

According to the present invention as described above, there is realized an image display in which the initial image changes every time the system is started, and the displayed object moves interactively, employing a small memory. Therefore, the user is allowed to enjoy the initial image and there can be constructed a household information system or like systems that are user friendly.

The invention claimed is:

1. A data processor coupled to a power source and a main storage device and comprising:

a display unit;

an input unit;

state storage means for storing a state of an image to be displayed, which state determines kinds of movement of the image;

a nonvolatile memory arranged in the data processor and being other than the main storage device of the data processor, said nonvolatile memory coupled to the display unit and to the input unit and comprising:

initial image display processing means, driven when the power source is turned on, and when the data processor is reset, for processing an initial moving image for display on said display unit until loading of a system program from said main storage device is completed, said initial image display processing means comprising:

image display update processing means for changing the image displayed as the moving image by calculation on said display unit with a passage of time based on the state of the image, input detect means for detecting input from said input unit, and image state select processing means for selecting, in response to the input from said input means, the state of the image that had been predetermined with respect to said input, and for storing the selected state in said state storage means.

2. A data processor according to claim 1, further comprising:
- a timer measuring the passage of time; wherein
  - said image display update processing means changes the image after every predetermined period of time measured by said timer.

3. A data processor according to claim 1, wherein said initial image display processing means determines attributes, inclusive of a position of a predetermined object to be displayed first on the screen, using random numbers.

4. A data processor according to claim 1, wherein said initial image display processing means further comprises initial image display end processing means for terminating display processing of the initial moving image one of upon receiving a predetermined input from said input unit and upon mounting of an external storage medium which has a predetermined data stored therein, and for starting processing corresponding to one of a predetermined auxiliary processing and to the external storage medium mounted.

5. A data processor according to claim 2, wherein said initial image display processing means determines attributes, inclusive of a position of a predetermined object to be displayed first on the screen, using random numbers.

6. A data processor according to claim 2, wherein said initial image display processing means further comprises initial image display end processing means for terminating display processing of the initial moving image one of upon receiving a predetermined input from said input unit and upon mounting of an external storage medium having a predetermined data stored therein, and for starting processing corresponding one of to a predetermined auxiliary processing and to the external storage medium that is mounted.

7. A data processor according to claim 3, wherein said initial image display processing means further comprises initial image display end processing means for terminating display processing of the initial moving image one of upon receiving a predetermined input from said input unit and upon mounting of an external storage medium having a predetermined data stored therein, and for starting processing corresponding one of to a predetermined auxiliary processing and to the external storage medium that is mounted.

8. A data processor according to claim 5, wherein said initial image display processing means further comprises initial image display end processing means for terminating display processing of the initial moving image one of upon receiving a predetermined input from said input unit and upon mounting of an external storage medium having a predetermined data stored therein, and for starting processing corresponding one of to a predetermined auxiliary processing and to the external storage medium that is mounted.

\* \* \* \* \*

UNITED STATES PATENT AND TRADEMARK OFFICE
CERTIFICATE OF CORRECTION

PATENT NO.:     5,838,890
DATED      :     November 17, 1998
INVENTOR(S):   Yoichi AOKI et al.

It is certified that error appears in the above-identified patent and that said Letters Patent is hereby corrected as shown below:

On the title page, [54] change "INITAL" to --INITIAL--.

Col. 1,   line 2, change "INITAL" to --INITIAL--;
          line 62, after "displayed" insert --.--;
          line 63, change "the" to --The--.

Col. 3,   line 37, delete ",". (2nd recurrence)

Signed and Sealed this

Fourth Day of May, 1999

Attest:

Q. TODD DICKINSON

*Attesting Officer*     Acting Commissioner of Patents and Trademarks